US008884569B2

(12) United States Patent
Aufschneider et al.

(10) Patent No.: US 8,884,569 B2
(45) Date of Patent: Nov. 11, 2014

(54) SECURE MOTOR STARTER

(75) Inventors: Klaus Aufschneider, Illschwang (DE); Markus Meier, Rieden (DE); Fritz Royer, Hahnbach (DE); Johann Seitz, Amberg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 14/241,749

(22) PCT Filed: Aug. 7, 2012

(86) PCT No.: PCT/EP2012/065443
§ 371 (c)(1),
(2), (4) Date: Mar. 26, 2014

(87) PCT Pub. No.: WO2013/029937
PCT Pub. Date: Mar. 7, 2013

(65) Prior Publication Data
US 2014/0203750 A1  Jul. 24, 2014

(30) Foreign Application Priority Data

Aug. 30, 2011 (DE) .......................... 10 2011 081 806

(51) Int. Cl.
*G01R 31/02* (2006.01)
*H02P 1/02* (2006.01)
(52) U.S. Cl.
CPC ..................................... *H02P 1/023* (2013.01)
USPC ....................................................... 318/490
(58) Field of Classification Search
CPC ...... G01R 31/343; G01R 31/42; G01R 31/34; H02K 11/001; G07C 3/00
USPC ....................................................... 318/490
See application file for complete search history.

(56) References Cited

U.S. PATENT DOCUMENTS

2010/0019717 A1* 1/2010 Bjerknes et al. .............. 318/723
2011/0310521 A1  12/2011 Dauer et al.
2012/0277058 A1* 11/2012 Ishikawa ........................ 477/3

FOREIGN PATENT DOCUMENTS

CN          201563083 U    8/2010
DE          10041633 A1    3/2002
(Continued)

OTHER PUBLICATIONS

International Search Report PCT/ISA/210 for PCT/EP2012/065443 dated Aug. 7, 2012.

(Continued)

*Primary Examiner* — Shawki S Ismail
*Assistant Examiner* — Zoheb Imtiaz
(74) *Attorney, Agent, or Firm* — Harness, Dickey & Pierce, P.L.C.

(57) ABSTRACT

According to an embodiment of the invention, a motor starter includes a connection module, which includes a second and third interface, wherein the second interface is electrically conductively connected to the third interface. The security evaluation unit can be mechanically coupled to the connection module so that an electrically conductive connection is produced between the first and second interfaces. The secure switch unit can be mechanically coupled to the connection module so that an electrically conductive connection between the third and fourth interfaces is produced, so that, in the coupled state of the security evaluation unit and the secure switch unit to the connection module; there is an electrically conductive connection between the first and fourth interfaces via the connection module, so that the control command can be transmitted from the security evaluation unit via the connection module to the secure switch unit.

16 Claims, 1 Drawing Sheet

(56) References Cited

FOREIGN PATENT DOCUMENTS

| | | | |
|---|---|---|---|
| DE | 102008031335 A1 | 1/2010 | |
| EP | 1126568 A1 | 8/2001 | |
| EP | 2080887 A1 | 7/2009 | |
| FR | 2858478 A1 | 2/2005 | |
| WO | WO 2008034394 A1 * | 3/2008 | ............. H01H 89/06 |
| WO | WO-2008034394 A1 | 3/2008 | |

OTHER PUBLICATIONS

International Preliminary Report on Patentability including annexes International Application No. PCT/EP2012/065443 dated Aug. 7, 2012.

German Office Action No. 10 2011 0811 806.5 dated Nov. 6, 2012.

* cited by examiner

SECURE MOTOR STARTER

PRIORITY STATEMENT

This application is the national phase under 35 U.S.C. §371 of PCT International Application No. PCT/EP2012/065443 which has an International filing date of Aug. 7, 2012, which designated the United States of America, and which claims priority to German patent application number DE 102011081806.5 filed Aug. 30, 2011, the entire contents of each of which are hereby incorporated herein by reference.

FIELD

At least one embodiment of the invention generally relates to a secure motor starter and/or a method for the secure control of a supply voltage of a consumer.

BACKGROUND

In the field of industrial automation engineering, motor starters are used for the operational switching of motor loads. Here, a switch unit of the motor starter controls, i.e. connects or disconnects, the supply voltage of a consumer, in particular an electric motor. Suitable embodiments of motor starters are also able to cover safety-relevant applications according to EN 13849 or IEC 61508.

For safety-oriented applications, the motor starter must have a secure design. For a secure design of a motor starter, it is necessary to provide redundancy in the motor starter. For example, two normal switching elements of the switch unit are connected in series for the same function. If the two switching elements also have a different design, this provides a diverse system. To ensure that a switch unit has a secure design, it must comprise at least two switching elements for switching a line.

F-starters of the ET200S series made by the company Siemens are examples of redundant diverse motor starters. In these starters, redundancy and diversity is achieved by the serial arrangement of a circuit breaker with an overvoltage release and contactor.

Decentralized sensors (for example emergency stop buttons) can be used to control the motor starter by means of a sensor signal so that the motor starter can react accordingly. In the case of a secure motor starter, a sensor signal of this kind is evaluated by way of a security evaluation unit of the motor starter. To this end, this security evaluation unit is connected to the sensor on the input side and to a secure switch unit of the motor control unit on the output side. The task of the security evaluation unit is to process the sensor signals of the sensor securely and to monitor them securely. Another task of the security evaluation unit is to monitor the correct function of the secure switch unit of the motor starter securely. For example, in the event of welding of one of the two switching elements of the secure switch unit, the reconnection of the two switching elements can be prevented by the security evaluation unit.

The connection of the security evaluation unit to the secure switch unit is currently achieved by way of the customer wiring the two units together. However, this means more work for the customer and a risk of error. It may also entail additional work to rectify errors in the case of faulty cabling and/or additional work for protected cable laying.

SUMMARY

At least one embodiment of the present invention is directed to a motor starter. In particular, at least one embodiment of the present invention is directed to one in which the amount of work on the part of the customer and the manufacturing costs are to be kept low.

In at least one embodiment, a secure motor starter includes a security evaluation unit and a secure switch unit, wherein the secure switch unit comprises a fourth interface and can securely control a supply voltage of a consumer and the security evaluation unit comprises a first interface and can transmit a control command to the fourth interface of the secure switch unit via the first interface, wherein the motor starter further comprises a connection module, which comprises a second and third interface, wherein the second interface is electrically conductively connected to the third interface, wherein the connection module can be mechanically coupled to the security evaluation unit and the secure switch unit, wherein the mechanical coupling of the security evaluation unit to the connection module enables an electrically conductive connection to be established between the first and second interface and the mechanical coupling of the secure switch unit to the connection module enables an electrically conductive connection to be established between the third and fourth interface so that, in the coupled state of the security evaluation unit and the secure switch unit to the connection module, an electrically conductive connection is present between the first and fourth interfaces via the connection module and hence the control command from the security evaluation unit can be transmitted via the connection module to the secure switch unit.

In at least one embodiment, a method is disclosed for the secure control of a supply voltage of a consumer by a secure motor starter, which comprises a security evaluation unit and a secure switch unit, wherein the secure switch unit comprises a fourth interface and can securely control the supply voltage of the consumer and the security evaluation unit comprises a first interface and can transmit a control command to the fourth interface of the secure switch unit via the first interface, wherein the motor starter further comprises a connection module, which comprises a second and third interface, wherein the second interface is electrically conductively connected to the third interface, wherein the security evaluation unit is mechanically connected to the connection module so that an electrically conductive connection is established between the first and second interface and the secure switch unit is mechanically connected to the connection module so that an electrically conductive connection is established between the third and fourth interface and hence there is an electrically conductive connection between the first and fourth interfaces via the connection module.

Advantageous developments of the invention are disclosed in the dependent claims.

BRIEF DESCRIPTION OF THE DRAWINGS

The following describes and explains the invention and embodiments of the invention in more detail with reference to the example embodiments shown in the figures, which show.

DETAILED DESCRIPTION OF THE EXAMPLE EMBODIMENTS

Figure 1:
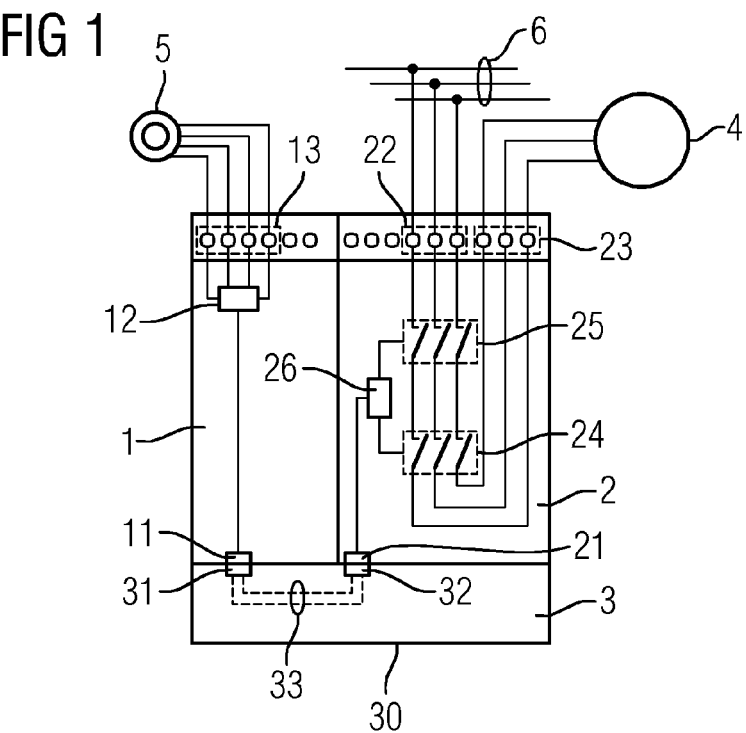
FIG. 1 a schematic structure of a secure motor starter.

With the motor starter according to at least one embodiment of the invention, the secure switch unit is electrically connected to the security evaluation unit by way of the connection module. To this end, the security evaluation unit and the secure switch unit are mechanically coupled to the connection module. During the mechanical coupling, the participating interfaces are also in electrical contact. An electrically conductive connection to the second interface of the connection module is established via the first interface of the security evaluation unit. The second interface of the connection module is electrically conductively connected to the third interface of the connection module. In the coupled state of the secure switch unit to the connection module, the third interface is electrically conductively connected to the fourth interface of the secure switch unit. Hence, in the coupled state of the units there is an electrically conductive connection between the first interface and the fourth interface, so that the security evaluation unit can transmit a signal to the secure switch unit via the connection module.

Consequently, a user only has to couple the security evaluation unit and the secure switch unit to the connection module in order to establish the necessary electrical connection between the security evaluation unit and the secure switch unit.

Here, preferably, the signal of the security evaluation unit characterizing the control command will be passed through to the secure switch unit unchanged via the connection module, i.e. the signal is not changed by the connection module.

The connection between the second and third interfaces is preferably achieved by way of a continuous line. If a plurality of signal types are transmitted from the security evaluation unit to the secure switch unit, there are preferably a plurality of continuous lines between the second and third interface.

A consumer is in particular an electric motor.

In an advantageous embodiment of the invention, the electrically conductive connection between the second and third interfaces of the connection module is guided within the housing of the connection module. The connection module is in particular made of an injection-molding material and should not be considered to be the equivalent of a line. In particular, the connection module substantially has the combined width of the security evaluation unit and the secure switch unit. Preferably, with respect to the side facing the security evaluation unit and the secure switch unit, the width of the side surface of the connection module is less than 50 mm, in particular about 45 mm.

In a further advantageous embodiment of the invention, the voltage supply of the secure switch unit can be switched off by way of the control command of the security evaluation unit so that a supply voltage of a consumer controlled via the secure switch unit is switched off. Disconnecting the supply voltage of the secure switch unit causes the supply voltage to the consumer to be automatically switched off. In this case single or two-pole disconnection of the secure switch unit is possible.

In a further advantageous embodiment of the invention, the control command of the security evaluation unit can control at least one switching element of the switch unit directly and/or via a processing unit of the switch unit so that a supply voltage of a consumer can be switched off via the switching element of the switch unit.

Consequently, the exposure of the security evaluation unit to the secure switch unit via the connection module can take place:

a) on the one hand, via the direct disconnection of the supply voltage by way of the control command and/or b) by way of the processing of the control command in the processing unit.

In the case of the direct disconnection of the supply voltage by way of the control command, a switching element of the switch unit is controlled directly by the signal of the security evaluation unit characterizing the control command. Hence, no processing of the signal characterizing the control command takes place in the processing unit of the secure switch unit.

If on the other hand, the signal characterizing the control command for further processing is supplied to the processing unit, the processing unit (controller) can impact securely on the supply voltage of the consumer by the secure switch unit. It is, for example, in the case of the presence of a control command of the security evaluation unit, possible by means of the processing unit, to switch off the supply voltage by the switch unit with low contact stress. To this end, it is possible, for example, to control another switching element of the secure switch unit.

The two options may also be combined, so that initially the processing unit switches off the supply voltage with low contact stress via a first switching element of the switch unit and this is then followed by the direct disconnection of a second switching element of the switch unit controlling the supply voltage.

In a further advantageous embodiment of the invention, in the coupled state of the security evaluation unit and the switch unit to the connection module, the security evaluation unit can determine the switch position of at least one switching element of the switch unit via the electrically conductive connection between the first and fourth interfaces.

To this end, the connection module also establishes an electrically conductive connection between the fourth and first interfaces so that evaluation signals can be transmitted. These evaluation signals are preferably only passed through the connection module i.e. there is no more extensive processing/analysis of the signal in the processing module. To this end, preferably, the existing electrically conductive connection, which is used to transmit the control command, can be used. However, it is also conceivable for a separate electrically conductive connection to be provided by the connection module so that the interfaces each have at least two separate contact points. Consequently, two lines are guided in the connection module.

In a further advantageous embodiment of the invention, the mechanical coupling of the security evaluation unit and the secure switch unit to the connection module is a detachable connection. The detachment of units from the connection module should, in particular, not result in any damage to the units and the connection module.

In the case of the mechanical coupling of the security evaluation unit to the connection module and the secure switch unit to the connection module, in particular a mechanically stable connection is established between the participating units and the connection modules so that unintentional separation of the units from the connection module is prevented. The mechanically stable coupling is achieved, for example, by means of a screwed connection or of a snap connection (positive connection) between the components. However, this stable connection can be released again such that there is no damage to the participating components.

In a further advantageous embodiment of the invention, the second and third interfaces of the connection module are arranged on the same side surface of the connection module.

In a further advantageous embodiment of the invention, the security evaluation unit can be connected to at least one sensor so that a sensor signal of the sensor present at the security evaluation unit can trigger an output of a control signal.

Consequently, the sensor can output a sensor signal to the security evaluation unit so that, in response, the security evaluation unit can issue a control command to the secure switch unit so that the supply voltage of the consumer is disconnected.

FIG. 1 shows a schematic structure of a secure motor starter. The motor starter can be used to control a consumer 4 (for example an electric motor) in a security-oriented way. To this end, the motor starter comprises a security evaluation unit 1, a connection module 3 and a secure switch unit 2.

The security evaluation unit 1 is connected on the input side 13 to a sensor 5 (for example an emergency stop button).

The secure switch unit 2 is connected on the input side 22 to a supply network 6 of the consumer 4 and on the output side 23 to the consumer 4 so that the energy supply of the consumer 4 is guided via the switch unit 2. Two switching elements 24,25 connected in series enable the switch unit 2 in each case to disconnect the energy supply to the consumer 4 and hence the supply voltage to the consumer 4.

The secure switch unit 2 is embodied as security-oriented so that the supply voltage of the consumer 4 is switched off securely in accordance with IEC 61508.

The security evaluation unit 1 comprises a first interface 11. The secure switch unit 2 comprises a fourth interface 21. The connection module 3 comprises second and third interfaces 31,32. For the electrical connection of the security evaluation unit 1 to the secure switch unit 2, a user now only needs to mechanically couple the security evaluation unit 1 and the secure switch unit 2 to the connection module 3. As a result of the mechanical coupling, the first interface 11 is electrically conductively connected to the second interface 31 and the third interface 32 to the fourth interface 21. Since the second interface 31 is electrically conductively connected to the third interface 32, a signal of the security evaluation unit 1 output via the first interface 11 can now be transmitted to the fourth interface 21 so that this signal is present at the switch unit 2.

The connection 33 between the second and third interfaces 31,32 is a continuous connection, i.e. the signals to be transmitted are not processed in the connection module 3.

Preferably, there is no communication by means of a protocol (for example AS-i, IO-Link, Profinet, etc.) via the connection module 3 between the security evaluation unit 1 and the secure switch unit 2.

In order to establish an electrical connection of the security evaluation unit 1 to the secure switch unit 2, a user only has to couple the security evaluation unit 1 and the secure switch unit 2 to the connection module 3 mechanically. The mechanical coupling of the two units 1,2 to the connection module 3 finally establishes the electrical connection between the first interface 11 and the fourth interface 21.

The state depicted shows the coupled state of the security evaluation unit 1 and the secure switch unit 2 to the connection module 3.

If, for example, it is desired to switch off the consumer 4 by actuating the emergency stop button (sensor 5) (a sensor signal is generated by actuating the sensor 5), the security evaluation unit 1 recognizes the actuation of the sensor 5 and then generates a control command for the switch unit 2. From the sensor signal of the sensor 5, in particular a processing unit 12 of the security evaluation unit 1 recognizes that the consumer 4 is to be switched off. The processing unit 12 then outputs the control command to the secure switch unit 2 via the first interface 11. This control command is transmitted by means of a control signal via the first interface 11 to the fourth interface 21 so that the secure switch unit 2 receives the control signal and hence the control command from the security evaluation unit 1.

The control command can now directly control either the first switching element 24 and/or second switching element 25 of the switch unit 2. The control command can also initially be received and evaluated by a processing unit 26 of the switch unit 2 so that the processing unit 26 effects a disconnection of the supply voltage of the consumer 4 via the first switching element 24 and/or second switching element 25 with low contact stress. To this end, the processing unit 26 controls the first and/or second switching element 24,25 accordingly. Consequently, in response to a control command of the security evaluation unit 1, contacts of the first and/or second switching element 24,25 can be opened so that the supply voltage is disconnected from the consumer 4.

Further, the connection module 3 establishes an electrically conductive connection between the first interface 11 of the security evaluation unit 1 and the fourth interface 21 of the switch unit 2 so that the security evaluation unit 1 can determine the switch position of the first and second switching element 24,25 of the switch unit 2. To this end, the connection module 3 comprises a separate line. Consequently, the electrically conductive connection 33 between the second interface 31 and the third interface 32 comprises two lines, one for the control command of the security evaluation unit 1 and one for monitoring the switch position of the first and second switching elements 24,25.

It is also conceivable for the second interface 31 to be connected to the third interface 32 by only one line or by a plurality of lines. Each line of the connection module preferably has a corresponding contact to the respective interfaces 11,21,31,32.

The lines of the connection module 3 are guided within the housing 30 of the connection module 3.

Figure 2:
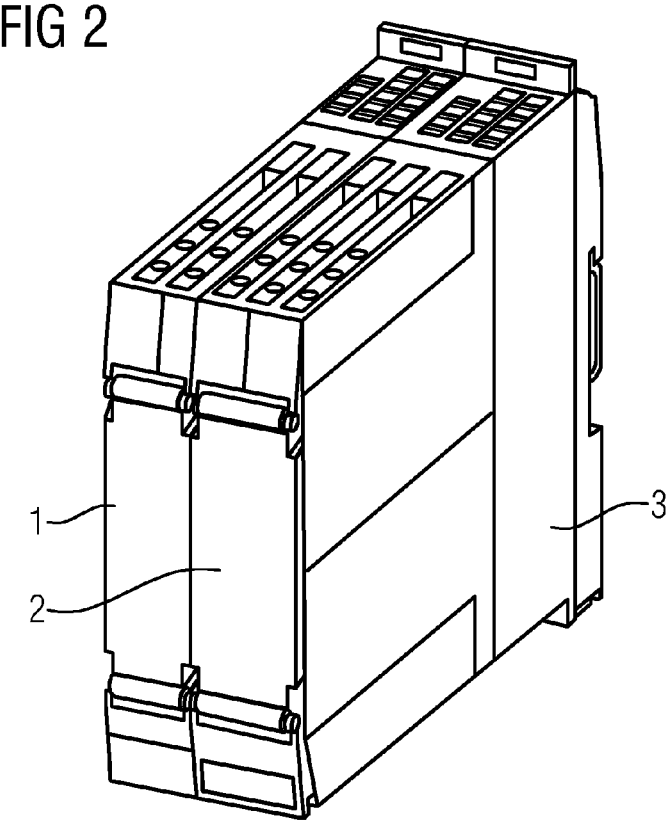
FIG. 2 a perspective view of a motor starter.

FIG. 2 shows a perspective view of a motor starter as shown in FIG. 1. The motor starter depicted shows the coupled state of the security evaluation unit 1 to the connection module 3 and of the secure switch unit 2 to the connection module 3. The second and third interfaces of the connection module 3 lie on the same side surface of the connection module 3 so that the security evaluation unit 1 and the secure switch unit 2 establish the mechanical and electrical connection to this via the same side surface of the connection module 3. The width of the connection module 3 is substantially the same as that of the security evaluation unit 1 and the secure switch unit 2 together. The side surface of the connection module 3 facing the second and third interfaces comprises a device for attachment to a mounting rail.

The invention claimed is:

1. A secure motor starter comprising:
   a security evaluation unit;
   a secure switch unit, wherein the secure switch unit includes two switching elements and a fourth interface and is configured to securely control a supply voltage of a consumer, wherein the security evaluation unit comprises a first interface and is configured to transmit a control command to the fourth interface of the secure switch unit via the first interface, and wherein the security evaluation unit is connectable to at least one sensor so that an output of the control command is triggerable by a sensor signal of the sensor present at the security evaluation unit; and
   a connection module, including a second and third interface, wherein the second interface is electrically conductively connected to the third interface, wherein the connection module is mechanically coupleable to the security evaluation unit and the secure switch unit, wherein the mechanical coupling of the security evaluation unit to the connection module enables an electrically conductive connection to be established between the first and second interface and the mechanical coupling of the secure switch unit to the connection module enables an electrically conductive connection to be established between the third and fourth interface so that, in the coupled state of the security evaluation unit and the secure switch unit to the connection module, there is an electrically conductive connection between the first and fourth interfaces via the connection module and hence the control command is transmitable from the security evaluation unit via the connection module to the secure switch unit, and wherein by way of the control command of the security evaluation unit, at least one switching element of the secure switch unit is controlled at least one of directly and via a processing unit of the secure switch unit so that a supply voltage of a consumer controlled via the switching element of the secure switch unit can be switched off.

2. The secure motor starter of claim 1, wherein the electrically conductive connection between the second and third interfaces of the connection module is guided within the housing of the connection module.

3. The secure motor starter of claim 1, wherein the voltage supply of the secure switch unit can be switched off by way of the control command of the security evaluation unit so that a supply voltage of a consumer controlled via the secure switch unit can be switched off.

4. The secure motor starter of claim 1, wherein, in the coupled state of the security evaluation unit and the switch unit to the connection module, the security evaluation unit is configured to determine the switch position of at least one switching element of the switch unit via the electrically conductive connection between the first and fourth interfaces.

5. The secure motor starter of claim 1, wherein the mechanical coupling between the security evaluation unit and the secure switch unit to the connection module is a detachable connection.

6. The secure motor starter of claim 1, wherein the second and third interfaces of the connection module are arranged on a same side surface of the connection module.

7. The secure motor starter of claim 6, wherein the side surface of the connection module facing the second and third interfaces comprises a device for attachment to a mounting rail.

8. The secure motor starter of claim 1, wherein the combined width of the connection module substantially equates to that of the security evaluation unit and the secure switch unit.

9. The secure motor starter of claim 1, wherein, in the case of the mechanical coupling of the security evaluation unit to the connection module and the secure switch unit to the connection module, a mechanically stable connection is established between the participating units and the connection modules so that unintentional separation of the units from the connection module is prevented.

10. A method for the secure control of a supply voltage of a consumer by a secure motor starter including a security evaluation unit and a secure switch unit, wherein the secure switch unit includes two switching elements and a fourth interface and is configured to securely control the supply voltage of the consumer and wherein the security evaluation unit includes a first interface and is configured to transmit a control command to the fourth interface of the secure switch unit via the first interface, wherein the security evaluation unit is connectable to at least one sensor so that an output of the control command is triggerable by a sensor signal of the sensor present at the security evaluation unit, wherein the motor starter further includes a connection module including a second and third interface, wherein the second interface is electrically conductively connected to the third interface, wherein the security evaluation unit is mechanically connected to the connection module so that an electrically conductive connection is established between the first and second interface and the secure switch unit is mechanically connected to the connection module so that an electrically conductive connection is established between the third and fourth interface and hence an electrically conductive connection is present between the first and fourth interfaces via the connection module, the method comprising:

controlling, via the control command of the security evaluation unit, a switching element of the switch unit at least one of directly and via a processing unit of the switch unit so that a supply voltage of a consumer controlled via the switching element of the switch unit can be switched off.

11. The method of claim 10, further comprising:
transmitting, via the security evaluation unit, the control command to the switch unit via the connection module.

12. The method of claim 10, further comprising:
determining, via the security evaluation unit, the switch position of the switching element of the switch unit via the electrically conductive connection between the first and fourth interfaces.

13. The method of claim 10, wherein the security evaluation unit is connected to at least one sensor, the method further comprising:
triggering, via the security evaluation unit, an output of a control signal by a sensor signal of the sensor present at the security evaluation unit.

14. The method of claim 11, further comprising:
determining, via the security evaluation unit, the switch position of the switching element of the switch unit via the electrically conductive connection between the first and fourth interfaces.

15. The method of claim 11, wherein the security evaluation unit is connected to at least one sensor, the method further comprising:
triggering, via the security evaluation unit, an output of a control signal by a sensor signal of the sensor present at the security evaluation unit.

16. The method of claim 12, wherein the security evaluation unit is connected to at least one sensor, the method further comprising:
triggering, via the security evaluation unit, an output of a control signal by a sensor signal of the sensor present at the security evaluation unit.

* * * * *